(12) United States Patent
Hart

(10) Patent No.: US 10,024,493 B2
(45) Date of Patent: Jul. 17, 2018

(54) SPEAKER MOUNT AND ASSEMBLY AND METHOD OF DISENGAGEMENT THEREOF

(71) Applicant: Jonathan Neil Hart, Salt Lake City, UT (US)

(72) Inventor: Jonathan Neil Hart, Salt Lake City, UT (US)

(73) Assignee: Swarm Holdings LLC, SLC, UT (US)

( * ) Notice: Subject to any disclaimer, the term of this patent is extended or adjusted under 35 U.S.C. 154(b) by 0 days.

(21) Appl. No.: 15/245,429

(22) Filed: Aug. 24, 2016

(65) Prior Publication Data

US 2018/0058629 A1    Mar. 1, 2018

(51) Int. Cl.
| | |
|---|---|
| *H04R 1/02* | (2006.01) |
| *F21V 21/04* | (2006.01) |
| *F16M 13/02* | (2006.01) |
| *E04B 9/00* | (2006.01) |
| *H04R 21/02* | (2006.01) |

(52) U.S. Cl.
CPC ............ *F16M 13/027* (2013.01); *E04B 9/006* (2013.01); *H04R 1/026* (2013.01); *H04R 21/02* (2013.01); *H04R 2201/021* (2013.01)

(58) Field of Classification Search
CPC ...... F16M 13/027; E04B 9/006; H04R 1/026; H04R 2201/021; H04R 1/025; H01R 13/625
USPC .................. 248/27.3, 231.31, 201, 317, 343; 381/340, 386, 387, 395, 182, 394; 439/529, 521; 181/150, 156, 155
See application file for complete search history.

(56) References Cited

U.S. PATENT DOCUMENTS

| | | | |
|---|---|---|---|
| 2,249,231 A | 7/1941 | Smith | |
| 3,250,558 A | 5/1966 | McClintock | |
| 4,439,643 A * | 3/1984 | Schweizer | ............. H04R 1/021 181/153 |
| 5,143,339 A | 9/1992 | Ashcraft et al. | |
| 6,101,262 A | 8/2000 | Haase et al. | |
| 6,203,052 B1 | 3/2001 | Dodge | |
| 6,588,543 B1 * | 7/2003 | Tchilinguirian | ........ F21V 21/04 181/150 |
| 6,741,720 B1 | 5/2004 | Myatt | |
| 6,925,190 B2 | 8/2005 | Popken et al. | |
| 7,483,544 B2 | 1/2009 | Wright et al. | |
| 7,549,780 B2 * | 6/2009 | Caluori | ................. F21V 21/043 362/145 |
| 7,587,059 B2 | 9/2009 | Wright | |
| 7,731,130 B2 | 6/2010 | Decanio et al. | |

(Continued)

*Primary Examiner* — Tan Le
(74) *Attorney, Agent, or Firm* — Jason P. Webb; Pearson Butler

(57) ABSTRACT

A speaker mount, assembly, and method of disengagement including a flange that circumscribes a perimeter of the mount. The speaker mount includes a support member coupled to the flange. The speaker mount includes a tab moveably coupled to the support member. The speaker mount includes a tab bias member functionally coupled to the tab. The speaker mount includes a path guide functionally coupled to the tab and to the support member. The path guide includes a vertical pathing and a rotational pathing that is substantially orthogonal to the vertical pathing. The speaker mount includes a blocking member functionally coupled to the tab such that in a blocking mode the blocking member obstructs free movement of the tab along the path guide and in a free mode does not obstruct.

16 Claims, 9 Drawing Sheets

(56) References Cited

U.S. PATENT DOCUMENTS

| | | | |
|---|---|---|---|
| 7,780,135 B2 | 8/2010 | Nelson et al. | |
| 8,023,664 B2 | 9/2011 | Yang | |
| 8,162,690 B2 | 4/2012 | Smith | |
| 8,231,403 B2 | 7/2012 | Smith | |
| 8,303,336 B2 | 11/2012 | Smith | |
| 8,485,487 B2 | 7/2013 | Cheng | |
| 8,526,655 B2 | 9/2013 | Dibb et al. | |
| 8,605,936 B2 | 12/2013 | Proni | |
| 8,631,897 B2 | 1/2014 | Stewart, Jr. et al. | |
| 8,646,569 B2 * | 2/2014 | Yoshida | H04R 1/026 181/150 |
| 9,479,852 B2 * | 10/2016 | Yang | H04R 1/025 |
| 2004/0179710 A1 * | 9/2004 | Farinelli, Jr. | H04R 1/025 381/386 |
| 2009/0324004 A1 * | 12/2009 | Yang | H04R 1/025 381/395 |
| 2010/0040254 A1 * | 2/2010 | Wright | H04R 1/02 381/395 |
| 2011/0017889 A1 | 1/2011 | Nelson et al. | |
| 2011/0228967 A1 * | 9/2011 | Kulchy | F16M 11/08 381/394 |
| 2012/0049024 A1 | 3/2012 | Smith | |

\* cited by examiner

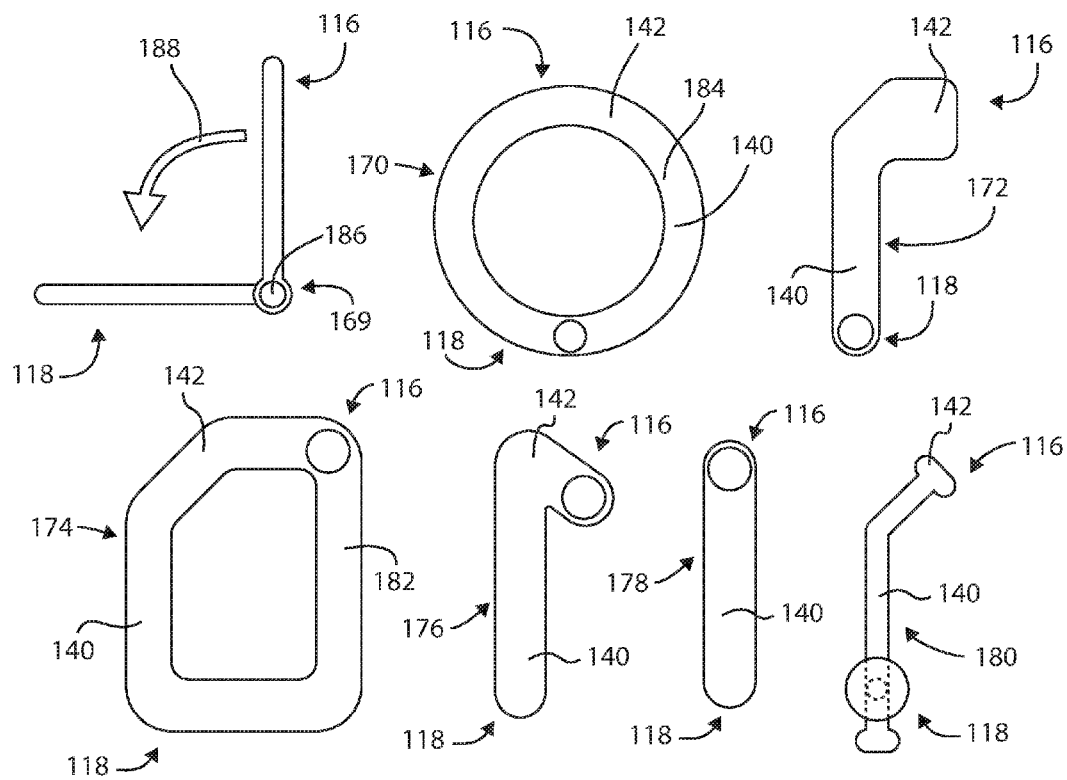
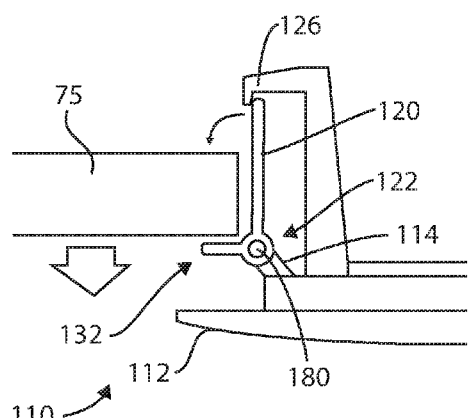
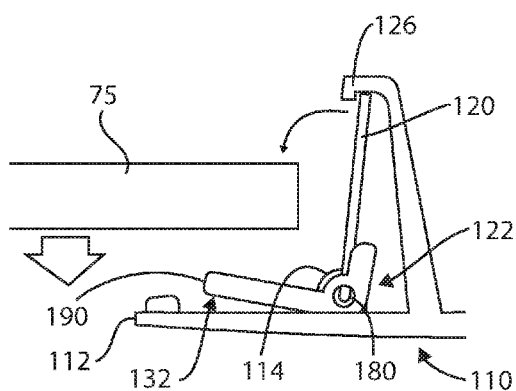
Fig. 8
Fig. 9                Fig. 10

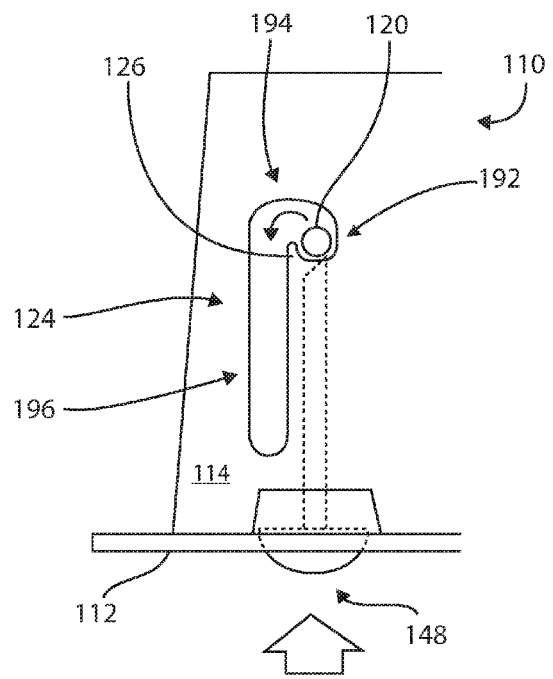
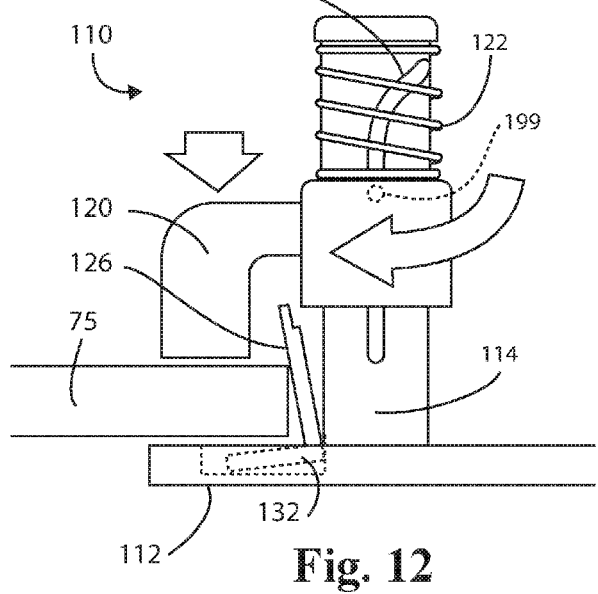
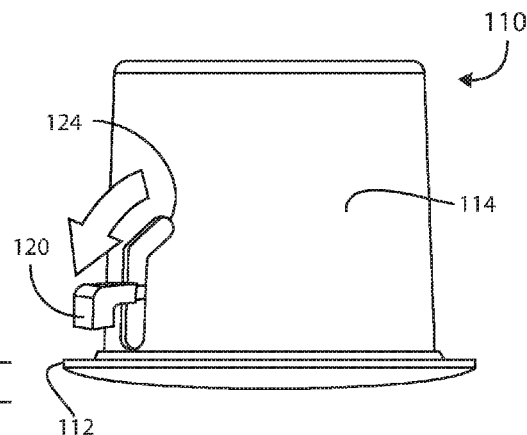
Fig. 11
Fig. 12
Fig. 13

SPEAKER MOUNT AND ASSEMBLY AND METHOD OF DISENGAGEMENT THEREOF

BACKGROUND OF THE INVENTION

Field of the Invention

The present invention relates to speaker mounts, specifically a speaker mount and assembly and a method of disengagement thereof.

Description of the Related Art

A speaker or loudspeaker is a device containing one or more electro-acoustic transducers; which converts an electrical audio signal into a corresponding sound. The most widely used type of speaker today is the dynamic speaker, invented in 1925 by Edward W. Kellogg and Chester W. Rice. The dynamic speaker operates on the same basic principle as a dynamic microphone, but in reverse, to produce sound from an electrical signal. When an alternating current electrical audio signal is applied to its voice coil, a coil of wire suspended in a circular gap between the poles of a permanent magnet, the coil is forced to move rapidly back and forth due to Faraday's law of induction, which causes a diaphragm (usually conically shaped) attached to the coil to move back and forth, pushing on the air to create sound waves. Besides this most common method, there are several alternative technologies that can be used to convert an electrical signal into sound. The sound source (e.g., a sound recording or a microphone) must be amplified with an amplifier before the signal is sent to the speaker.

Speakers are typically housed in an enclosure which is often a circular, rectangular, or square box made of wood, metal, or sometimes plastic, and the enclosure plays an important role in the quality of the sound. Where high fidelity reproduction of sound is required, multiple loudspeaker transducers are often mounted in the same enclosure, each reproducing a part of the audible frequency range. In this case the individual speakers are referred to as "drivers" and the entire unit is called a loudspeaker. Drivers made for reproducing high audio frequencies are called tweeters, those for middle frequencies are called mid-range drivers, and those for low frequencies are called woofers. Smaller loudspeakers are found in devices such as radios, televisions, portable audio players, computers, and electronic musical instruments. Larger loudspeaker systems are used for music, sound reinforcement in theatres and concerts, and in public address systems.

Some improvements have been made in the field. Examples of references related to the present invention are described below in their own words, and the supporting teachings of each reference are incorporated by reference herein:

U.S. Pat. No. 7,587,059, issued to Wright, discloses a baffle assembly fastening system and mounting frame assembly that can be installed and secured without the use of tools. A baffle assembly frame defining an opening to receive a fixture and having an exposed first surface. A fastener is rotationally coupled to the baffle frame. The fastener extends from the exposed first surface to secure the baffle assembly to a recessed mounting frame, wherein the fastener can be manually rotated from a disengaged position to an engaged position [sic] in less ring is coupled to the baffle assembly and has a plurality of aligning posts that serve to align the baffle assembly as it is inserted into a recessed mounting frame.

U.S. Pat. No. 7,549,780, issued to Caluori, discloses a recessed lighting fixture includes a housing having one or more side walls, one or more of which including at least one elongate slot formation, the slot formation including a pair of oppositely extending lateral edge formations, each lateral edge formation having a first dimension, a retaining clip to be located in the slot formation for movement therealong. The retaining clip has a first portion to extend through the slot formation and to travel along an inner surface of the corresponding side wall on opposite sides of the slot formation, a second portion having a second dimension exceeding the first dimension and to travel along an outer surface of a corresponding side wall on opposite sides of the slot formation. The second portion is arranged to be biased outwardly from the housing relative to the first portion, the second portion joined to a third portion, the third portion being arranged to extend through the slot formation in a retained position, in which the third portion is retained against an inner surface of the corresponding lateral edge formation with the second portion in a spring-loaded orientation. The third portion is movable from the retained position to a released position when separated from the lateral edge formation, thereby causing the second portion to be transferred from its spring-loaded orientation to an outwardly extended orientation relative to the housing.

U.S. Pat. No. 5,143,339, issued to Ashcraft et al., discloses a speaker mounting assembly wherein the speaker is supported on a ceiling or wall construction. The baffle associated with the speaker includes a grille face exposed on the exterior of the ceiling or wall and an opposed interior face. Brackets are supported on the interior face, and frame clips are connected to the brackets. These clips include an inwardly extending portion which provides for the attachment of a hairpin spring. A ring is located in spaced relationship with the interior face of the baffle, and openings are defined by the ring for receiving each hairpin spring. In particular, the hairpin spring includes spring arms adapted to engage opposite side edges of the ring openings with the arms being urged apart for thereby urging the baffle toward the ring. The baffle is adapted to be pulled away from the ring in opposition to the action of the spring arms for permitting access to the speaker. The openings for receiving the spring arms preferably define at least two sets of opposed side edges whereby the engagement of the spring arms can be switched between sets of openings to permit adjustment of the forces holding the baffle in position adjacent to the ring.

U.S. Pat. No. 8,485,487, issued to Cheng, discloses an easy-mount in-ceiling speaker mount has multiple fastening units mounted on an in-ceiling speaker. Each fastening unit has a base frame, a torsion spring securely mounted on the base frame, a pivoting member pivotally mounted on the base frame, a slider plate longitudinally movable on the base frame, and a spring holder receiving the torsion spring, pivotally mounted on the base frame and blocked by the pivoting member. When the speaker mount is moved upwardly through a ceiling, a bottom of the ceiling holds a ceiling support formed on the slider plate and the pivoting member is pushed and pivoted. After being unblocked from the pivoting member, the spring holder is pivoted to hold a top of the ceiling in completion of the mounting of the speaker mount. Accordingly, the mounting procedures of the speaker mount can be easily achieved by simply pushing it upwardly through a ceiling.

U.S. Pat. No. 7,731,130, issued to Decanio et al., discloses a spring loaded mounting mechanism for easily mounting and removing a loudspeaker housing within an opening in a surface. The mounting mechanism includes a shaft connected to the loudspeaker housing. Attached to the shaft is a spring actuated arm. The actuated arm is compressed inward toward the housing by the side walls of the surface surrounding the opening when the housing is being positioned within the opening. At a certain point when the housing is inserted far enough into the opening, the actuated arm will lose contact with the side walls of the surface surrounding the opening and will expand to its open position. In its open position, the arm is positioned just behind or against the back face of the surface surrounding the opening, locking the housing into the opening in the surface. The invention further allows for the spring actuated arm to be tightened against or moved away from the back face of the surface by adjusting the positioning of the shaft. To remove the housing from the opening, the spring actuated arm may be moved away from the back face of the surface surrounding the opening by compressing the arm inward toward the housing. The arm may be compressed inward through the use of a device or by the hand of a user. Once the arm is compressed inward, the housing may be easily removed from the opening.

The inventions heretofore known suffer from a number of disadvantages which include being difficult to use, being difficult to install, being unduly complex, being limited in application, being limited in use, being limited in adaptability especially to ranges of wall thickness, being expensive, being expensive/difficult to manufacture, requiring too many parts, needing tools to install, being difficult to remove, being difficult to install/uninstall, being slow to install, having an undesirable and/or non-standard exterior/interior appearance, failing to provide a consistent hold across a range of and/or varying wall thicknesses, failing to grip a sloppy hole well, having too large a profile, taking up too much space (e.g. during storage/transport), having a mechanism that will not work with different tab styles, and/or being too heavy.

What is needed is a speaker mount and assembly and a method of disengagement thereof that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available speaker mounts and assemblies. Accordingly, the present invention has been developed to provide an easy to install and disengage a speaker mount or assembly.

According to one embodiment of the invention, there is a speaker mount that may include a flange. The flange may circumscribe a perimeter of the mount. The speaker mount may include a support member that may be coupled to the flange and may have an elevated region spaced therefrom and a closer region closer to the flange than the elevated region. The support member may be a tower.

The speaker mount may include a tab that may be moveably coupled to the elevated region of the support member. The speaker mount may include a tab bias member that may be functionally coupled to the tab such that the tab may be biased towards the flange. The speaker mount may include a path guide that may be functionally coupled to the tab and to the support member and may be shaped and positioned to restrict motion of the tab relative to the support member to a path between the elevated region and the closer region. The path guide may include a vertical pathing and a rotational pathing that may be substantially orthogonal to the vertical pathing.

The speaker mount may include a blocking member that may be functionally coupled to the tab such that in a blocking mode the blocking member may obstruct free movement of the tab along the path guide and in a free mode may not obstruct. The speaker mount may include a trigger assembly that may be functionally coupled to the blocking member such that the blocking member may transition from the blocking mode to the free mode relative to the tab when the trigger assembly is triggered. The trigger assembly may include a trigger bias member that may bias the blocking member in a blocking mode. The trigger assembly may include a foot near the flange that may be substantially parallel thereto and spaced therefrom.

The speaker mount may include a secondary blocking member that may be functionally coupled to the tab such that if the tab is moved to the elevated region after the trigger assembly is triggered, the secondary blocking member may restrict the tab to the elevated region. The speaker mount may include an actuating member that may be functionally coupled to the tab that when actuated causes the tab to move towards the elevated region.

According to one embodiment of the invention, there is a mount assembly that may include a flange. The flange may circumscribe a perimeter of the mount. The mount assembly may include a support member that may be coupled to the flange and may have an elevated region spaced therefrom and a closer region closer to the flange than the elevated region.

The mount assembly may include a tab that may be moveably coupled to the elevated region of the support member. The support member may be a tower. The mount assembly may include a tab bias member that may be functionally coupled to the tab such that the tab may be biased towards the flange.

The mount assembly may include a path guide that may be functionally coupled to the tab and to the support member and may be shaped and positioned to restrict motion of the tab relative to the support member to a path between the elevated region and the closer region. The path guide may include a vertical pathing and a rotational pathing that may be substantially orthogonal to the vertical pathing.

The mount assembly may include a blocking member that may be functionally coupled to the tab such that in a blocking mode the blocking member may obstruct free movement of the tab along the path guide and in a free mode may not obstruct. The mount assembly may include a trigger assembly that may be functionally coupled to the blocking member such that the blocking member may transition from the blocking mode to the free mode when the trigger assembly is triggered. The trigger assembly may include a trigger bias member that may bias the blocking member in a blocking mode. The trigger assembly may include a foot near the flange that may be substantially parallel thereto and spaced therefrom.

The mount assembly may include a secondary blocking member that may be functionally coupled to the tab such that if the tab is moved to the elevated region after the trigger assembly is triggered, the secondary blocking member may restrict the tab to the elevated region. The mount assembly may include an actuating member that may be functionally coupled to the tab that when actuated causes the tab to move towards the elevated region.

According to one embodiment of the invention, there is a method of disengaging a mount assembly. The mount assembly may include a tab, a path guide; a secondary blocking member; and an actuating member, wherein the mount assembly may be engaged to a surface. The path guide may be functionally coupled to the tab and support member and shaped and positioned to restrict motion of the tab relative to the support member to a path between an elevated region and a closer region and wherein the path guide may include a vertical pathing and a rotational pathing that may be substantially orthogonal to the vertical pathing.

The method of disengaging a mount assembly may include the step of actuating the actuating member until the secondary blocking member engages with the tab. The step of actuating the actuating member may be performed by inserting through an aperture in the mount assembly and thereby engaging the actuating member with a tool. The method may include the step of withdrawing the mount from the surface.

The method of disengaging the mount assembly may include the step of rotating the actuating member while actuating the same. The method may include the step of repeating the step of actuating the actuating member for each of a plurality of actuating members, tabs, and secondary locking members of the mount assembly.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 8 illustrates a plurality of views of a path guide configuration of a speaker mount, according to one embodiment of the invention;

FIG. 9 illustrates a side elevational view of a speaker mount, according to one embodiment of the invention;

FIG. 10 illustrates a side elevational view of a speaker mount, according to one embodiment of the invention;

FIG. 11 is a side elevational view of a speaker mount, according to one embodiment of the invention;

FIG. 12 is a side elevational view of a speaker mount engaging a surface, according to one embodiment of the invention;

FIG. 13 is a side elevational view of a mount assembly, according to one embodiment of the invention.

DETAILED DESCRIPTION OF THE INVENTION

Figure 1:
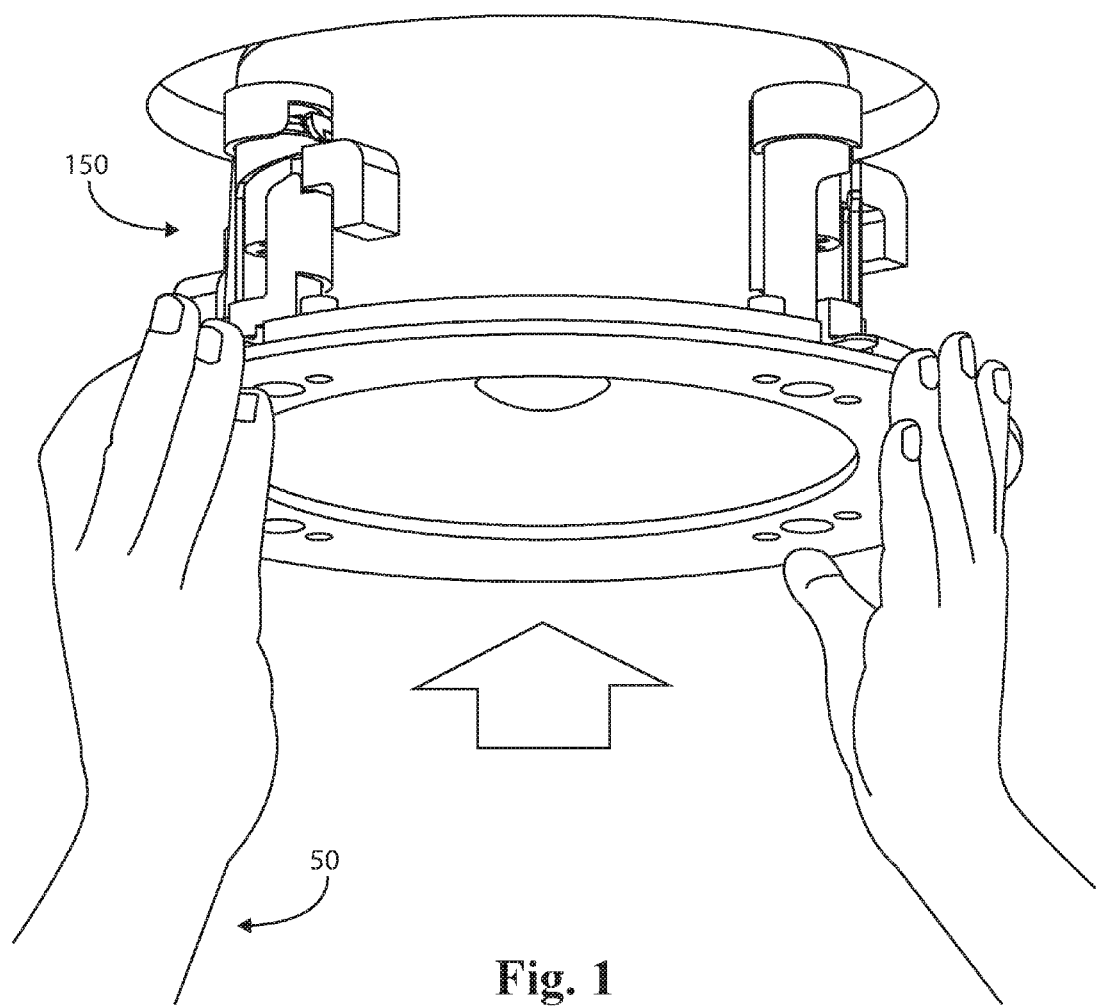
FIG. 1 is a bottom perspective view of a user installing a mount assembly, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a bottom perspective view of a user installing a mount assembly, according to one embodiment of the invention. There is shown a user 50 installing a mount assembly 150 into a wall/ceiling/surface 75. The illustrated mount assembly is a speaker mount assembe, as an audio speaker is illustrated within the body/housing of the assembly.

The illustrated mount assembly 150 includes a flange, and a plurality of mounts (also called herein speaker mounts). The user inserts the mount assembly into an appropriately sized hole through the wall/ceiling/surface 75 and presses it completely against the surface. The action of pressing the assembly against the surface causes the triggering mechanism on each mount to trigger, which releases the tabs and causes them to move toward the surface. In the illustrated embodiment, there is no need to screw down, manipulate or otherwise use tools or extra actions to couple the assembly to the surface. The tab biasing member in each mount puts pressure on the tabs to lock them against the surface and hold the mounted object (e.g. speaker, electrical box, plumbing fixture, lighting, disco ball, projector) in place.

Advantageously, the mount may be installed to a surface without tools (once a hole is created through the surface) and without the need to fine-tune the coupling to match the width of the wall through which the hole exists. This advantageously allows for very rapid high-quality installation and reduces the expertise/experience needed for the same. Accordingly, such structures may be installed in a facility/room/building at a reduced cost and faster schedule. It is typical to need many such mount assemblies installed in commercial buildings and therefore the benefits are substantial and multiplied by such needs.

Figure 2:
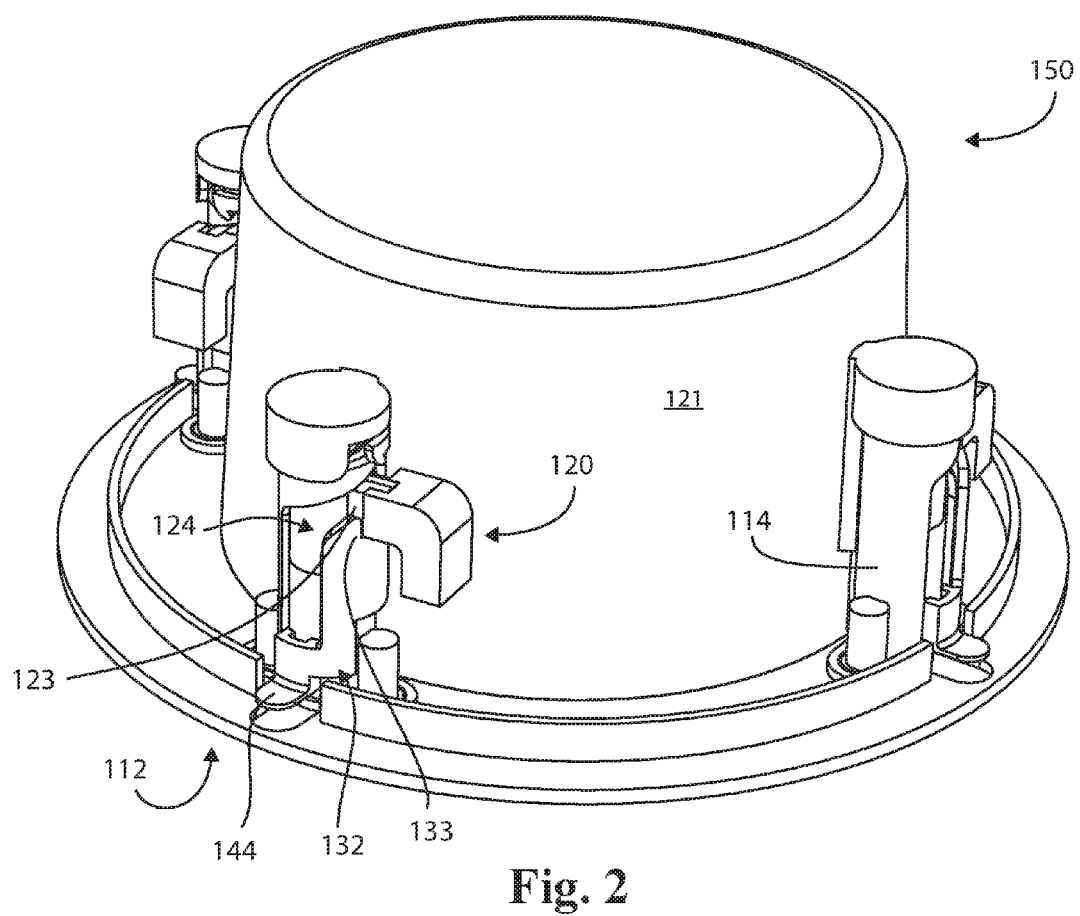
FIG. 2 is a top perspective view of a mount assembly, according to one embodiment of the invention.

FIG. 2 is a top perspective view of a mount assembly, according to one embodiment of the invention. There is shown a mount assembly 150 including a flange 112 disposed about a body/housing 121 with a plurality of mounts extending upwardly therefrom, each mount including a support member 114, a tab 120, a trigger assembly 132 having a foot 144, and a path guide 124 through which the tab 120 may travel.

The illustrated mount assembly 150 includes a flange 112. The flange 112 circumscribes a perimeter of the mount 150 about the body/housing 121 of the assembly within which may be disposed an operational component (e.g. speaker, lighting, component fixture(s)/mount(s), electronics). The flange includes a plurality of mounts extending upwardly therefrom and provides a structure that effectively couples the mounts to the housing/body and displaces the mounts outwardly therefrom such that the mounts can provide a mounting function to mount the housing within a hole in a surface. Generally, the flange is thin so that it creates a low profile from the surface when mounted thereto and a bottom surface of the flange is colored/textured in an aesthetically pleasing manner, as it will be visible against the surface when installed.

The mount assembly 150 includes a support member 114 coupled to the flange 112. The illustrated support member 114 is a tower. The illustrated mount assembly 150 includes a plurality of such towers 114 disposed around an exterior edge of the mount assembly 150, extending upwardly from the flange/rim 112. The support member 114 provides structure for the other illustrated components so that they can operate in relation to each other to provide mounting operations. The illustrated support members 114 form the path guides 124, wherein such guides are portions through the support members where material is removed or otherwise not present in a shape and configuration and the illustrated tab 120 extends from an interior of the support member through the path guide to an exterior of the support member, thus trapping the tab within the channel (path guide) of the support member. The illustrated support member may be removably coupled to the flange, such as but not limited to by screws extending through the flange upwardly into the illustrated side portions of the support members. Alternatively, the support members may be non-removably fixedly coupled to the flange through welding, adhesive, integral formation, and the like and combinations thereof.

The illustrated mount assembly 150 includes a trigger assembly 132 including a foot 144 functionally coupled to a lip 133 in the path guide that traps the tab 120 in an upward position. The illustrated trigger assembly is spring loaded and biased in an upward/locked position that locks the tab in a ready mode until the trigger assembly is triggered by depression of the foot (e.g. by operation of the edge region of a wall pressing against the foot as the assembly is inserted into a hole in the wall, See FIGS. 4 and 6). The illustrated foot is functionally coupled to a lip by a solid body of rigid material, such that as the foot moves, the lip moves substantially in the same manner so that the lip can move out of the way of the neck of the tab.

The illustrated mount assembly 150 includes a tab 120 moveably coupled to the support member 114. The illustrated tab extends through the path guide 124 from an interior of the support member to an exterior of the same. The illustrated tab is of a "dog ear" style, in that the tab includes a curved section at the exterior end region that curves downward to a blunt end intended to make physical contact with an interior surface of the wall/ceiling/etc. near the edge of the hole through the wall. The illustrated neck 123 of the tab (i.e. the portion of the tab physically engaged with the path guide) is trapped by a lip 133 in the path guide that operates as part of the trigger assembly 132 such that when the trigger assembly triggers, the illustrated lip withdraws (downwardly) thus allowing the neck of the tab to traverse the path guide. As the tab is spring loaded (see FIGS. 4 and 5) and thereby biased to a downward position, when the lip is removed, the tab immediately traverses the path guide to a position of lower potential energy. The path guide is shaped such that in doing so, the tab swings around and travels downward to thereby engage with a backside of the region of the wall near the hole edge (See FIG. 6).

The mount assembly 150 includes a path guide 124 functionally coupled to the tab 120 and to the support member 114. The path guide 124 is shaped and positioned to restrict motion of the tab 120 relative to the support member 114 and also to provide a path through which the tab travels to go from a ready mode to an installed mode, the ready mode being one wherein the tab is out of the way of the assembly during insertion of the assembly into a hole and the installed mode being wherein the tab is pressed against a backside of a wall near an edge of a hole, thereby securing the assembly to the wall. While the illustrated path guide provides such a path, it is understood that the path shapes that perform the same are plethoric. Further examples of paths that may be formed by path guides are shown in FIG. 8, with the path illustrated in FIG. 2 being most similar, but not identical, to the two right-most paths of FIG. 8. Further, while the path guide of FIG. 2 is a cut-out section of the support 114, path guides need not only be or be limited to being cut-out sections, but may include rails, rods, caps, bumpers, and the like and other structures that limit travel of a tab to a particular path.

The mount assembly 150 may be a speaker housing, wherein the plurality of towers 114 easily couples to a surface, such as a wall or ceiling. Accordingly, such a mount assembly may easily, securely, and quickly mount a speaker to a wall/ceiling of a building for use therewithin. Should removal of the speaker be needed (e.g. for maintenance or upgrade), the mounts may be disengaged, such as but not limited to by the disengagement sequence illustrated in FIG. 7.

In operation, the mount assembly 150 is simply inserted into a hole within a wall or ceiling and the plurality of towers 114 engage a surface and coupled thereto when triggered by the exterior surface of the wall coming into contact with an applying force to the feet 144 of the trigger assembly 132, which triggers the release of the spring-loaded tabs such that they traverse the path thereby swinging outwardly and against the interior surface of the wall at spaced out positions (generally at least 3) around the mounting assembly, thereby immediately holding the same in place without the use of tools or adjustments.

Figure 3:
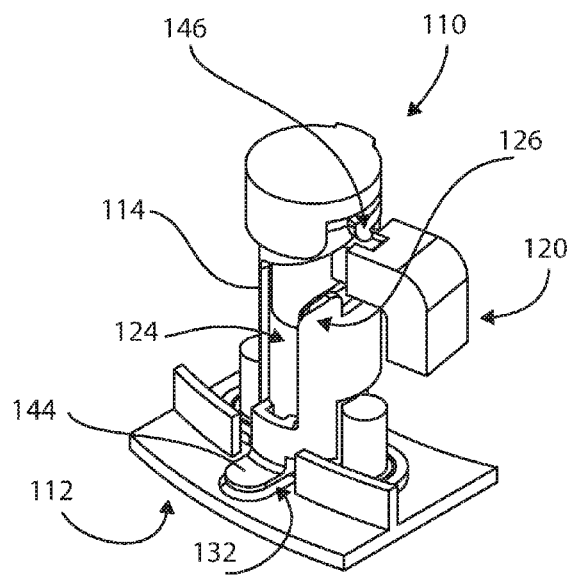
FIG. 3 is a top perspective view of a speaker mount, according to one embodiment of the invention.

FIG. 3 is a top perspective view of a mount (called herein a speaker mount for contextual convenience, but not limited to use with speakers), according to one embodiment of the invention. There is shown a speaker mount 110 including a flange 112, a support member 114, a tab 120, a path guide 124, and a trigger assembly 132 including a blocking member 126, a secondary blocking member 146, and a foot 144 as well as one or more springs/bias members (not shown) to bias the trigger assembly in a mode ready to be triggered.

The illustrated speaker mount 110 is designed to selectably couple a component, such as but not limited to a speaker housing, to a surface such as a ceiling or wall without the use of tools or other instruments. The illustrated speaker mount 110 includes a flange 112, wherein the flange 112 circumscribes a perimeter of the mount 110. The speaker mount 110 includes a support member 114 coupled to the flange 112.

The illustrated speaker mount 110 includes a tab 120 moveably coupled to the support member 114. The illustrated support member 114 is a tower but other support structures are contemplated, including but not limited to the housing itself being a support member and forming the path guide (See FIG. 13). The speaker mount 110 includes a path guide 124 functionally coupled to the tab 120 and to the support member 114. The path guide 124 is shaped and positioned to restrict motion of the tab 120 relative to the support member 114 to a path that allows for a ready mode wherein the tab is positioned out of the way for installation, and a secure mode wherein the tab is secured against a surface, thereby securing the mount assembly to the surface.

The illustrated speaker mount 110 includes a blocking member 126 functionally coupled to the tab 120 such that in a blocking mode, the blocking member 126 obstructs free movement of the tab 120 along the path guide 124 and in a free mode does not obstruct. The illustrated blocking member 126 includes a lip that prevents motion of the tab out of a ready mode. The blocking member may be considered as part of the trigger assembly or may be considered to be coupled thereto.

The speaker mount 110 includes a trigger assembly 132 functionally coupled to the blocking member 126 such that the blocking member 126 transitions from the blocking mode to the free mode relative to the tab (e.g. either the blocking member or the tab move relative to each other or both move) when the trigger assembly 132 is triggered. The trigger assembly 132 includes a trigger bias member, not shown, that biases the blocking member 126 in the blocking mode.

The illustrated speaker mount 110 includes a secondary blocking member 146 functionally coupled to the tab 120 such that if the tab 120 is moved to an elevated region after the trigger assembly 132 is triggered, the secondary blocking member 146 restricts the tab 120 to the elevated region even though the blocking member 126 would not restrict the same. This allows for removal of the mount assembly from a surface even while the surface is applying force to the trigger assembly (See FIG. 7).

According to one embodiment of the invention, there is a device to automate speaker installation. The device 110 automates the speaker clamping portion of the installation process. A benefit is that the installer no longer needs to bring tools with him up the ladder. The device is fully automatic (no need to push any buttons) and the device automatically adjusts to an arbitrary thickness of wall/sheetrock. The device may be used for mounting other devices to a surface, including but not limited to electrical boxes, recessed lighting, vents for HVAC, or anything that goes into a perforated surface.

The device may be a speaker mount. Such may include a tab, or dog that clamps down on the backside of the wall once actuated. The device may include a spring that preloads the tab, wherein the tab is functionally coupled to a trigger mechanism that once triggered causes the spring to apply force to the tab and causes it, constrained by path guide, to rotate and clamp down against the wall following a helical path so that the tab is smoothly and easily actuate in both directions. The trigger mechanism is a sheath disposed about the tower that may slide up and down the tower. The trigger mechanism has a spring that biases the device in the position that causes the sheath to obstruct motion of the tab in a ready mode. When the trigger is triggered, the sheath pulls out of the helical path and then allows the spring-loaded tab to path to a locking position.

According to one embodiment of the invention, there is a device 110 including a tab 120 movably coupled to a high region of a tower 114. The device 110 includes a bias member functionally coupled to the tab 120 to bias the tab 120 into a locked-down mode. The device 110 includes a path guide 124 functionally coupled to the tower 114 and the tab 120 such that the path guide 124 guides the tab 120 between a ready-mode and a locked-down mode. The device 110 includes a path blocking member 126 functionally coupled to the path guide 124 such that when in a blocking mode it blocks transition of the tab 120 between the ready-mode and the locked-down mode. The device 110 includes a triggering member 132 functionally coupled to the path blocking member 126 such that it may transition the path blocking member 126 from the blocking mode to a free mode. The device 110 also includes a trigger bias member functionally coupled to the triggering member 132 and biasing the same to a position wherein the path blocking member 126 is in a blocking mode.

According to one embodiment of the invention, there is an installation device including one or more of: a trigger; a vertically sliding tab (e.g. wing, slat, finger, cam, brush, special material or structure at the contact surface like rubber, elastic material); a tab bias member which may include one or more of various springs, leaf spring, coil spring, compression spring, tension spring; elastic portion of one of the other members/parts, elastomer block, compressed fluid, magnetic, poly-magnets, and the like and combinations thereof; a tower or variation thereof, e.g. does not have to be cylindrical, does not have to be a closed profile, may be a post instead of hollow tower, may include multiple towers, tower may be formed by one or more other components, may be a flange formed into the mount; a tab bias member which may include one or more of various springs, leaf spring, coil spring, compression spring, tension spring; elastic portion of one of the other members/parts, elastomer block, compressed fluid, magnetic, poly-magnets, and the like and combinations thereof; a triggering member which may include one or more of a flange, button, protrusion, knob, switch, actuator/solenoid, magnetic trigger, electrical trigger, toggle, lacking a trigger entirely (manual triggering); a path blocking member which may include one or more of a flange, protrusion, sheath, pin, hollow or solid, gate, sliding, rotating, inside the tower, integrated into the tower, clip; a trigger bias member which may include one or more of various springs, leaf spring, coil spring, compression spring, tension spring; elastic portion of one of the other members/parts, elastomer block, compressed fluid, magnetic, polymagnets; and a path guide which may take the form of one or more of being helical, L-shaped, vertical, formed in body of tower, separate from the tower, wireframe, wire/rod/rib guide that mates with a slot/aperture through the tab.

Figure 4:
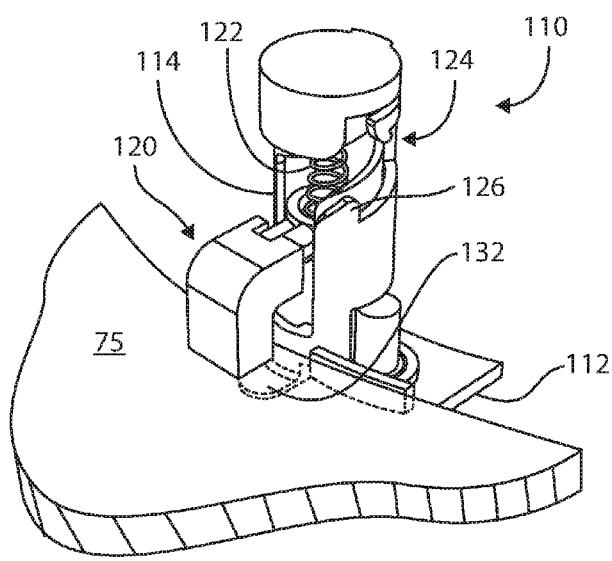
FIG. 4 is a top perspective view of a speaker mount engaging a surface, according to one embodiment of the invention.

FIG. 4 is a top perspective view of a speaker mount, according to one embodiment of the invention. The mount is shown in a secure mode wherein the tab is secure against the surface. There is shown a speaker mount 110 including a flange 112, a support member 114, a tab 120 coupled to a surface 75 (e.g. sheet rock panel of a wall or ceiling), a path guide 124, a blocking member 126, and a trigger assembly 132.

The illustrated speaker mount 110 includes a flange 112, wherein the flange 112 circumscribes a perimeter of the mount 110. The speaker mount 110 includes a support member 114 coupled to the flange 112. The speaker mount 110 includes a tab 120 moveably coupled to the support member 114. The illustrated support member 114 is a tower. The speaker mount 110 includes a tab bias member 122 functionally coupled to the tab 120 such that the tab 120 is biased towards the flange 112 by operation of a bias member 122 that is coupled between a top portion of the tab and a bottom surface of the top of the tower.

The speaker mount 110 includes a path guide 124 functionally coupled to the tab 120 and to the support member 114. The path guide 124 is shaped and positioned to restrict motion of the tab 120 relative to the support member 114. The speaker mount 110 includes a blocking member 126 functionally coupled to the tab 120 such that when in a blocking mode, the blocking member 126 obstructs free movement of the tab 120 along the path guide 124 and when in a free mode (secure mode) does not obstruct. The speaker mount 110 includes a trigger assembly functionally coupled to the blocking member 126 such that the blocking member 126 transitions from a blocking mode to the free mode when the trigger assembly is triggered. The trigger assembly is actuated when the surface 75 engages a foot of the trigger assembly and actuates the tab 120 to move along the path guide 124 and clamp and secure the speaker mount 110 to the surface 75.

Figure 5:
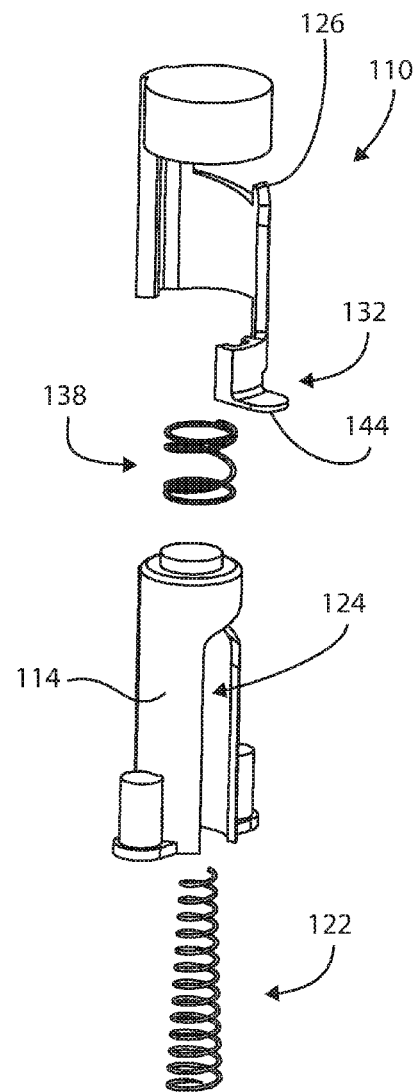
FIG. 5 is a side elevational exploded view of a speaker mount, according to one embodiment of the invention.

FIG. 5 is a side elevational exploded view of a speaker mount, according to one embodiment of the invention. There is shown a speaker mount 110 including a flange 112, a support member 114, a tab 120, a tab bias member 122, a path guide 124, a blocking member 126, a trigger assembly 132, and a trigger bias member 138.

The illustrated speaker mount 110 includes a flange 112, wherein the flange 112 is disposed or coupled to a speaker housing. The speaker mount 110 includes a support member 114 coupled to the flange 112 and having an elevated region spaced therefrom and a closer region closer to the flange 112 than the elevated region. The speaker mount 110 includes a tab 120 moveably coupled to the elevated region of the support member. The illustrated support member 114 is a tower. The speaker mount 110 includes a tab bias member 122 functionally coupled to the tab 120 such that the tab 120 is biased towards the flange 112. The illustrated tab bias member is disposed between a top surface of the tab and a bottom surface of the top of the tower.

The illustrated speaker mount 110 includes a path guide 124 functionally coupled to the tab 120 and to the support member 114. The path guide 124 is shaped and positioned to restrict motion of the tab 120 relative to the support member 114 to a path between the elevated region and the closer region. The path guide 124 includes a vertical pathing and a rotational pathing substantially orthogonal to the vertical pathing.

The speaker mount 110 includes a blocking member 126 functionally coupled to the tab 120 such that in a blocking mode the blocking member 126 obstructs free movement of the tab 120 along the path guide 124 and in a free mode does not obstruct. The speaker mount 110 includes a trigger assembly 132 functionally coupled to the blocking member 126 such that the blocking member 126 transitions from the blocking mode to the free mode when the trigger assembly 132 is triggered. The trigger assembly 132 includes a trigger bias member 138 that biases the blocking member 126 in the blocking mode. The illustrated trigger bias member is disposed between a top surface of the top of the tower and a bottom surface of the top of the trigger assembly. The trigger assembly 132 includes a foot 144 near the flange 112 substantially parallel thereto and spaced therefrom such that when pressure is applied to the foot towards the flange, the foot may move in that direction, thereby moving the blocking member as well.

Figure 6:
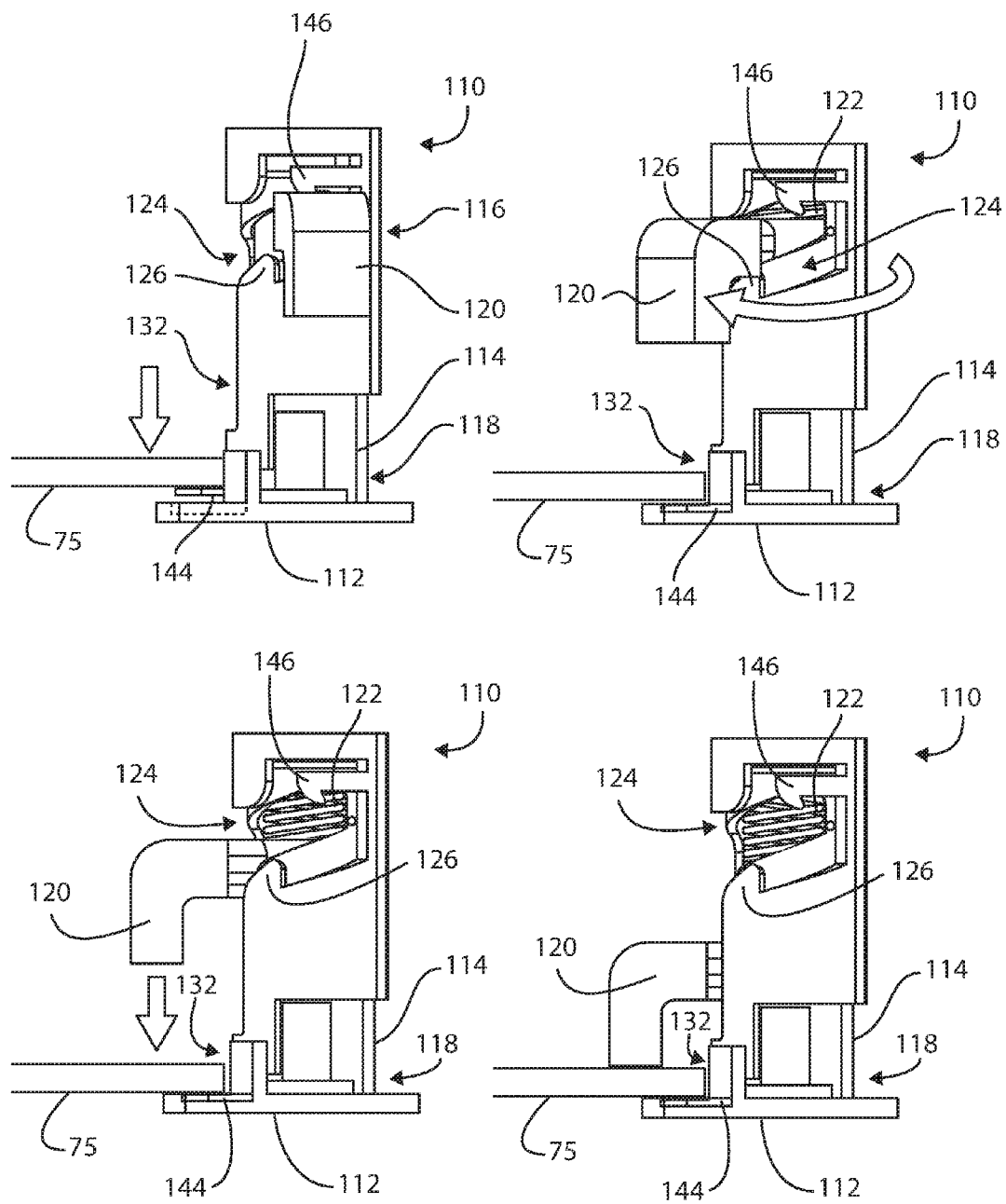
FIG. 6 illustrates a plurality of side elevational view of a speaker mount, according to one embodiment of the invention.

FIG. 6 illustrates a plurality of side elevational views of a speaker mount, according to one embodiment of the invention. There is shown a speaker mount 110 including a flange 112, a support member 114 having an elevated region 116 and a closer region 118, a tab 120, a tab bias member 122, a path guide 124, a blocking member 126, and a trigger assembly 132. The plurality of views, when viewed in the order of top-left, top-right, bottom-left, and bottom-right, form a sequence of installation of the mount to a wall/ceiling/surface, wherein the trigger assembly is triggered and the tab moves from a ready mode to a secure mode clamping the surface between the tab and the flange.

The illustrated speaker mount 110 includes a flange 112 coupled to a speaker housing, wherein the flange 112 circumscribes a perimeter of the mount 110. The speaker mount 110 includes a support member 114 coupled to the flange 112 and having an elevated region 116 spaced therefrom and a closer region 118 closer to the flange 112 than the elevated region 116.

The speaker mount 110 includes a tab 120 moveably coupled to the elevated region 116 of the support member 114. The speaker mount 110 includes a tab bias member 122 functionally coupled to the tab 120, such that the tab 120 is biased towards the flange 112. The illustrated support member 114 is a tower. The speaker mount 110 includes a path guide 124 functionally coupled to the tab 120 and to the support member 114. The path guide 124 is shaped and positioned to restrict motion of the tab 120 relative to the support member 114 to a path between the elevated region 116 and the closer region 118.

The illustrated speaker mount 110 includes a blocking member 126 functionally coupled to the tab 120 such that in a blocking mode the blocking member 126 obstructs free movement of the tab 120 along the path guide 124 and in a free mode does not obstruct. The speaker mount 110 includes a trigger assembly 132 functionally coupled to the blocking member 126 such that the blocking member 126 transitions from the blocking mode to the free mode when the trigger assembly 132 is triggered. The trigger assembly 132 includes a foot 144 near the flange 112 substantially parallel thereto and spaced therefrom; wherein when a surface 75 comes into contact with the foot 144, the tab 120 is activated and released to travel the path guide from the elevated region 116 to the closer region 118 with driving force from the tab bias member 122 and clamp and secure the speaker mount 110 to the surface 75.

The speaker mount 110 includes a secondary blocking member 146 functionally coupled to the tab 120 such that if the tab 120 is moved to the elevated region 116 after the trigger assembly 132 is triggered, the secondary blocking member 146 restricts the tab 120 to the elevated region 116.

Figure 7:
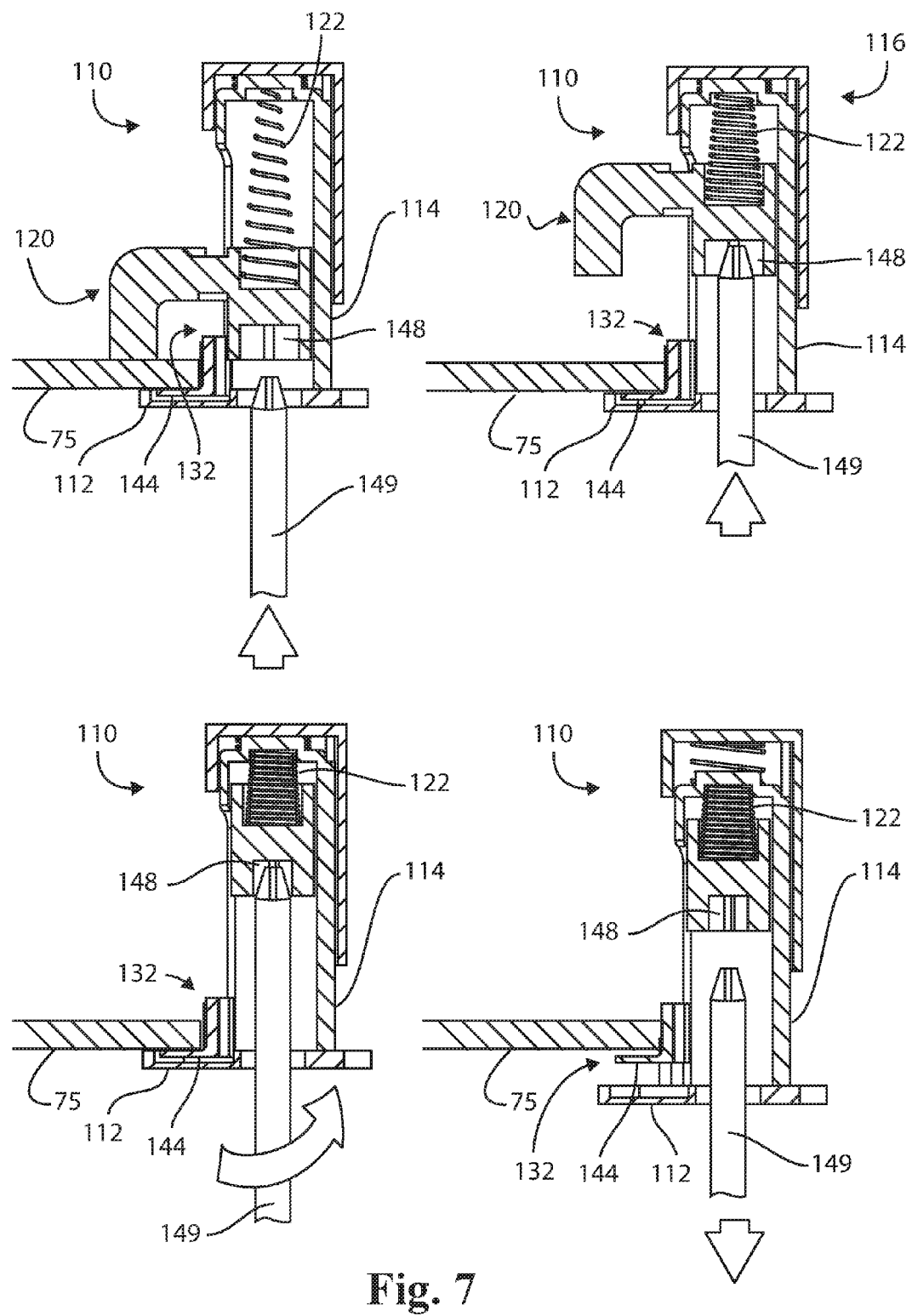
FIG. 7 illustrates a plurality of side elevational cross-sectional views of a speaker mount disengaging a surface, according to one embodiment of the invention.

FIG. 7 illustrates a plurality of side elevational cross-sectional views of a speaker mount, according to one embodiment of the invention. There is shown a speaker mount 110 including a flange 112, a support member 114, a tab 120, a tab bias member 122, a trigger assembly 132, and an actuating member 148. The plurality of views, when viewed in the order of top-left, top-right, bottom-left, and bottom-right, form a sequence of disengagement of the mount from a wall/ceiling/surface, wherein the tab is lifted and moved into a ready mode while the foot is still depressed and then the mount may then be removed from the surface.

In the views, a tool 149, illustrated as a Philip's head screwdriver, may be inserted through an aperture in a bottom of the mount to mate with an actuating member 148 disposed within the tower at a bottom of the tab 120. The tool 149 is pressed against the actuating member 148, which lifts the tab away from the surface and up towards a ready mode. This also compresses the tab bias member 122. The tool 149 is rotated to turn the tab 120 back along the path to the blocking members and in particular to engage with the second blocking member (as the first blocking member is out of the way of the path because the foot is depressed). The tab then locks into a ready mode with the second blocking member and the tool may be withdrawn. Once all mounts are so disengaged, the entire assembly may be withdrawn from the hole in the surface. As the assembly is withdrawn, the trigger bias member decompresses, thus reactivating the trigger and lifting the foot away from the flange.

The illustrated speaker mount 110 includes a flange 112 coupled to a speaker housing, wherein the flange 112 circumscribes a perimeter of the mount 110. The flange 112 is designed to trap or clamp to a surface 75, such as a wall or ceiling, against a tab 120. The speaker mount 110 includes a support member 114 coupled to the flange 112. The tab 120 is moveably coupled to the support member 114. The illustrated support member 114 is a tower. The speaker mount 110 includes a tab bias member 122 functionally coupled to the tab 120, such that the tab 120 is biased towards the flange 112. The speaker mount 110 includes a path guide 124 functionally coupled to the tab 120 and to the support member 114.

The illustrated speaker mount 110 includes a trigger assembly 132 functionally coupled to a blocking member (not shown) such that the blocking member transitions from the blocking mode to the free mode when the trigger assembly 132 is triggered. The trigger assembly 132 includes a foot 144 near the flange 112 substantially parallel thereto and spaced therefrom; wherein when a surface 75 comes into contact with the foot 144, the tab 120 is activated and released to travel the path guide and clamp and secure the speaker mount 110 to the surface 75.

The speaker mount 110 includes a secondary blocking member (not shown) functionally coupled to the tab 120 such that if the tab 120 is moved to the elevated region 116 after the trigger assembly 132 is triggered, the secondary blocking member restricts the tab 120 to the elevated region 116. The illustrated speaker mount 110 includes an actuating member 148 functionally coupled to the tab 120 that when actuated causes the tab 120 to move towards an elevated region.

FIG. 8 illustrates a plurality of views of a path guide of a speaker mount, according to one embodiment of the invention. These may be side plan views of such and/or may be flat projections of such paths as the paths may be disposed through a curved surface (e.g. a cylindrical tower). There is shown a plurality of path guides having a vertical pathing 140 and most including a rotational pathing 142, wherein a tab travels from an elevated region 116 to a closer region 118 along the path guide.

The illustrated path guides are coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide is functionally coupled to the tab and to the support member; wherein the path guide is shaped and positioned to restrict motion of the tab relative to the support member to a path between the elevated region 116 and the closer region 118. The closer region is closer to the flange than the elevated region, such that the tab may clamp down on the surface between the flange and the tab when the tab travels from the elevated region to the closer region. The path guide includes a vertical pathing 140 and a rotational pathing 142 substantially orthogonal to the vertical pathing 140.

There is also shown a path guide 169 having a pivot point 186 and a rotational pathing 188, wherein a tab travels from an elevated region 116 to a closer region 118 around the path guide 180. The illustrated path guide 180 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 180 is functionally coupled to the tab and to the support member; wherein the path guide 180 is shaped and positioned to restrict motion of the tab relative to the support member to a rotational path between the elevated region 116 and the closer region 118. The path guide 180 includes a pivot point 186 and a rotational pathing 188. Path guide 169 may be a top and/or side plan view depending on how the structure is configured.

There is also shown a path guide 170 having a continuous pathing 184, wherein a tab travels from an elevated region 116 to a closer region 118 along the path guide 170. The illustrated path guide 170 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 178 functionally coupled to the tab and to the support member; wherein the path guide 178 is shaped and positioned to restrict motion of the tab relative to the support member to a path between the elevated region 116 and the closer region 118. The path guide 178 includes a continuous pathing 184.

There is also shown a path guide 172 having a vertical pathing 140 and a rotational pathing 142, wherein a tab travels from an elevated region 116 to a closer region 118 along the path guide 172. The illustrated path guide 172 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 172 functionally coupled to the tab and to the support member; wherein the path guide 172 is shaped and positioned to restrict motion of the tab relative to the support member to a path between the elevated region 116 and the closer region 118. The path guide 172 includes a vertical pathing 140 and a rotational pathing 142 substantially orthogonal to the vertical pathing 140.

There is also shown a path guide 174 having a vertical pathing 140 and a rotational pathing 142, wherein a tab travels from an elevated region 116 to a closer region 118 along the path guide 174. The path guide 174 also includes a secondary return path 182, wherein a tab travels from a closer region 118 to an elevated region 116. The illustrated path guide 174 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 174 functionally coupled to the tab and to the support member; wherein the path guide 174 is shaped and positioned to restrict motion of the tab relative to the support member to a path between the elevated region 116 and the closer region 118. The path guide 174 includes a vertical pathing 140 and a rotational pathing 142 substantially orthogonal to the vertical pathing 140, and a secondary return path 182.

There is also shown a path guide 176 having a vertical pathing 140 and a rotational pathing 142, wherein a tab travels from an elevated region 116 to a closer region 118 along the path guide 176, but a portion of the path is more elevated than the elevated region 116. The illustrated path guide 176 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 176 functionally coupled to the tab and to the support member; wherein the path guide 176 is shaped and positioned to restrict motion of the tab relative to the support member to a path between the elevated region 116 and the closer region 118. The path guide 176 includes a vertical pathing 140 and a rotational pathing 142 substantially orthogonal to the vertical pathing 140.

There is also shown a path guide 178 having a vertical pathing 140, wherein a tab travels from an elevated region 116 to a closer region 118 along the path guide 178. The illustrated path guide 178 is coupled to a support member, not shown, wherein the support member includes an elevated region 116 spaced therefrom and a closer region 118 closer to a flange than the elevated region. The path guide is designed to guide a tab that is moveably coupled to the elevated region of the support member. The path guide 178 functionally coupled to the tab and to the support member; wherein the path guide 178 is shaped and positioned to restrict motion of the tab relative to the support member to a path between the elevated region 116 and the closer region 118. The path guide 178 includes a vertical pathing 140.

There is also shown path guide 180, wherein the illustrated path guide 180 includes a vertical pathing 140 and a rotational pathing 142 substantially orthogonal to the vertical pathing 140 such that a tab may follow such pathing from an elevated region 116 to a closer region 118. The illustrated path guide 180 is formed by a rod through an aperture in a tab body instead of being a cut-away through a tower.

FIG. 9 illustrates a side elevational view of a speaker mount, according to one embodiment of the invention. There is shown a speaker mount 110 including a flange 112, a support member 114, a tab 120 coupled to a path guide 180, a blocking member 126, and a trigger assembly 132.

The illustrated speaker mount 110 includes a flange 112, wherein the flange 112 circumscribes a perimeter of the mount 110. The speaker mount 110 includes a support member 114 coupled to the flange 112. The speaker mount 110 includes a tab 120 moveably coupled to the support member 114. The speaker mount 110 includes a tab bias member 122 functionally coupled to the tab 120 such that the tab 120 is biased towards the flange 112.

The speaker mount 110 includes a path guide 180 functionally coupled to the tab 120 and to the support member 114. The path guide 180 is shaped and positioned to restrict motion of the tab 120 to a rotational path relative to the support member 114. The speaker mount 110 includes a blocking member 126 functionally coupled to the tab 120 such that when in a blocking mode, the blocking member 126 obstructs free movement of the tab 120 along the path guide 180 and when in a free mode does not obstruct. The speaker mount 110 includes a trigger assembly 132 functionally coupled to the tab 120 such that the tab 120 transitions from a blocked mode to the free mode when the trigger assembly is triggered. The trigger assembly is actuated when the surface 75 engages a foot of the trigger assembly and actuates the tab 120 to move along the path guide 180 and clamp and secure the speaker mount 110 to the surface 75.

FIG. 10 illustrates a side elevational view of a speaker mount, according to one embodiment of the invention. There is shown a speaker mount 110 including a flange 112, a support member 114, a tab 120 coupled to a path guide 180, a blocking member 126, and a trigger assembly 132.

The illustrated speaker mount 110 includes a flange 112, wherein the flange 112 circumscribes a perimeter of the mount 110. The speaker mount 110 includes a support member 114 coupled to the flange 112. The speaker mount 110 includes a tab 120 moveably coupled to the support member 114. The speaker mount 110 includes a tab bias member functionally coupled to the tab 120 such that the tab 120 is biased towards the flange 112.

The speaker mount 110 includes a path guide 180 functionally coupled to the tab 120 and to the support member 114. The path guide 180 is shaped and positioned to restrict motion of the tab 120 to a rotational path relative to the support member 114. The speaker mount 110 includes a blocking member 126 functionally coupled to the tab 120 such that when in a blocking mode, the blocking member 126 obstructs free movement of the tab 120 along the path guide 180 and when in a free mode does not obstruct. The speaker mount 110 includes a trigger assembly 132 functionally coupled to the tab 120 such that the tab 120 transitions from a blocked mode to the free mode when the trigger assembly is triggered. The trigger assembly is actuated when the surface 75 engages a foot 190 of the trigger assembly and actuates the tab 120 to move along the path guide 180 and clamp and secure the speaker mount 110 to the surface 75. The foot 190 is pivotally coupled to the tab 120 such that it may remain fixed in place as the tab 120 rotates along the path guide 180.

FIG. 11 is a side elevational view of a speaker mount, according to one embodiment of the invention. There is shown a speaker mount 110 including a flange 112, a support member 114, a tab 120, a path guide 124, a blocking member 126, an actuating member 148, an upper tab stability region 192, a tab release region 194, and a lower tab stability region 196.

The illustrated speaker mount 110 includes a flange 112, wherein the flange 112 circumscribes a perimeter of the mount 110. The speaker mount 110 includes a support member 114 coupled to the flange 112. The speaker mount 110 includes a tab 120 moveably coupled to the support member 114. The speaker mount 110 includes a tab bias member functionally coupled to the tab 120 such that the tab 120 is biased towards the flange 112.

The speaker mount 110 includes a path guide 124 functionally coupled to the tab 120 and to the support member 114. The path guide 124 is shaped and positioned to restrict motion of the tab 120 to a path relative to the support member 114. The speaker mount 110 includes a blocking member 126 coupled to the support member 114. The tab bias member provides a force toward the flange 112 such that when elevated to the upper tab stability region 192 the blocking member 126 blocks the path of tab 120. The speaker mount 110 includes an actuating member 148 functionally coupled to the tab 120 such that when actuating member 148 is engaged it moves tab 120 from the upper tab stability region 192 to the tab release region 194 where blocking member 126 no longer blocks the path of tab 120. When tab 120 is moved to tab release region 194, the tab bias member 122 moves the tab along the path guide 124 toward the flange 112 and clamps and secures the speaker mount 110 to the surface at a closer region 196.

FIG. 12 is a side elevational view of a speaker mount, according to one embodiment of the invention. There is shown a speaker mount 110 including a flange 112, a support member 114, a tab 120, a tab bias member 122, a path guide 124, a blocking member 126, and a trigger assembly 132.

The illustrated speaker mount 110 includes a flange 112, wherein the flange 112 circumscribes a perimeter of the mount 110. The speaker mount 110 includes a support member 114 coupled to the flange 112. The speaker mount 110 includes a tab 120 moveably coupled to the support member 114. The illustrated support member 114 is a post having a channel/slot running therethrough as a path guide 124. The illustrated tab 120 is a ring that slides over the support member 114. The speaker mount 110 includes a tab bias member 122 functionally coupled to the tab 120 such that the tab 120 is biased towards the flange 112.

The speaker mount 110 includes a path guide 124 functionally coupled to the tab 120 and to the support member 114. The illustrated path guide 124 is shaped and positioned to restrict motion of the tab 120 relative to the support member 114 because the tab includes a peg 199 that extends into the path guide 124. The speaker mount 110 includes a blocking member 126 functionally coupled to the tab 120 such that when in a blocking mode, the blocking member 126 obstructs free movement of the tab 120 along the path guide 124 and when in a free mode does not obstruct. The speaker mount 110 includes a trigger assembly functionally coupled to the blocking member 126 such that the blocking member 126 transitions from a blocking mode to the free mode when the trigger assembly is triggered. The trigger assembly is actuated when the surface 75 engages a foot of the trigger assembly and actuates the tab 120 to move along the path guide 124 and clamp and secure the speaker mount 110 to the surface 75.

FIG. 13 is a side elevational view of a mount assembly, according to one embodiment of the invention. There is shown a speaker mount 110 including a flange 112, a support member 114, a tab 120, and a path guide 124.

The illustrated speaker mount 110 includes a flange 112, wherein the flange 112 circumscribes a perimeter of the mount 110. The speaker mount 110 includes a support member 114 coupled to the flange 112, wherein the support member 114 is the component housing. The speaker mount 110 includes a tab 120 moveably coupled to the support member 114. The illustrated support member 114 is integrated into the body of the speaker. The speaker mount 110 includes a tab bias member 122 functionally coupled to the tab 120 such that the tab 120 is biased towards the flange 112.

The speaker mount 110 includes a path guide 124 functionally coupled to the tab 120 and to the support member 114. The path guide 124 is shaped and positioned to restrict motion of the tab 120 relative to the support member 114. The speaker mount 110 includes a blocking member functionally coupled to the tab 120 such that when in a blocking mode, the blocking member obstructs free movement of the tab 120 along the path guide 124 and when in a free mode does not obstruct. The speaker mount 110 includes a trigger assembly functionally coupled to the blocking member such that the blocking member transitions from a blocking mode to the free mode when the trigger assembly is triggered. The trigger assembly is actuated when the surface engages a foot of the trigger assembly and actuates the tab 120 to move along the path guide 124 and clamp and secure the speaker mount 110 to the surface.

Figure 14:
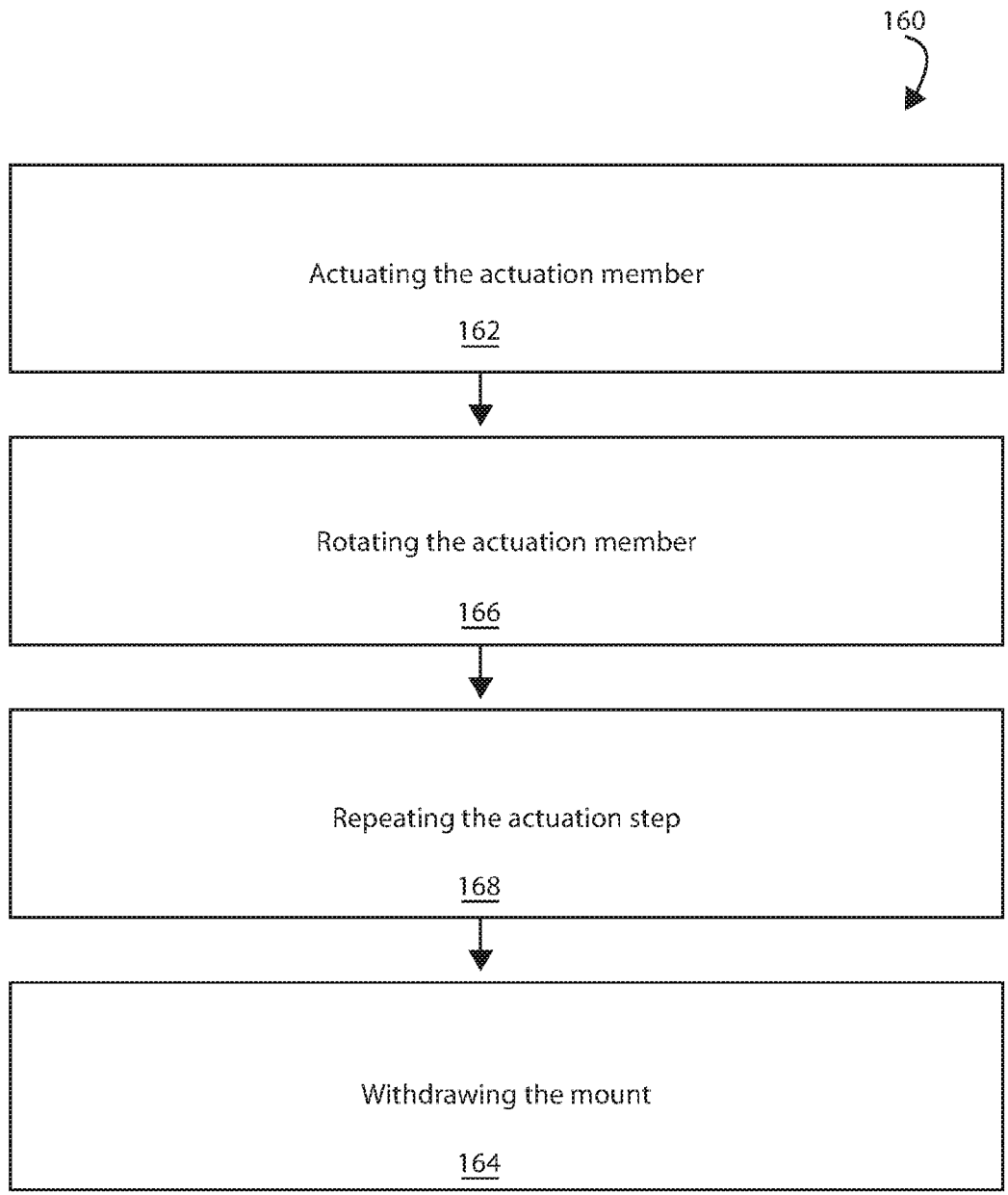
FIG. 14 is a flowchart of a method of disengaging a mount assembly, according to one embodiment of the invention.

FIG. 14 is a flowchart of a method of disengaging a mount assembly, according to one embodiment of the invention. There is shown a method of disengaging a mount assembly 160 including the following steps.

The illustrated method of disengaging a mount assembly 160 includes a mount assembly having a tab, a path guide; a secondary blocking member; and an actuating member, wherein the mount assembly is engaged to a surface. The path guide is functionally coupled to the tab and support member and shaped and positioned to restrict motion of the tab relative to the support member to a path between an elevated region and a closer region and wherein the path guide includes a vertical pathing and a rotational pathing that is substantially orthogonal to the vertical pathing.

The method of disengaging a mount assembly 160 includes the step of actuating the actuating member until the secondary blocking member engages with the tab 162. The step of actuating the actuating member 162 includes the step of inserting through an aperture in the mount assembly and thereby engaging the actuating member with a tool. The method includes the step of withdrawing the mount from the surface 164.

The method of disengaging the mount assembly 160 includes the step of rotating the actuating member while actuating the same 166. The method 160 includes the step of repeating the step of actuating the actuating member for each of a plurality of actuating members, tabs, and secondary locking members of the mount assembly 168.

Figure 15:
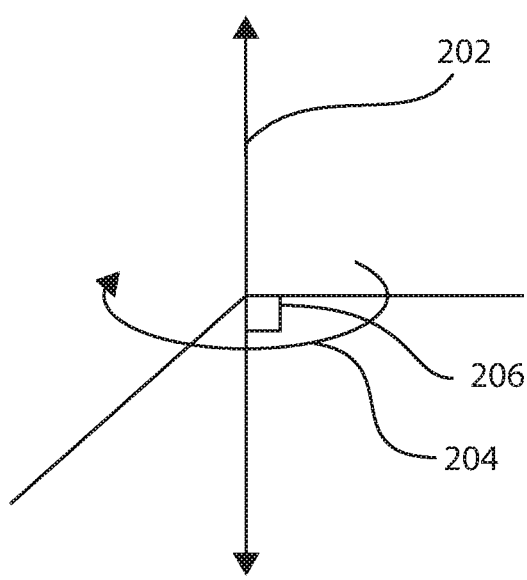
FIG. 15 illustrates the mathematical concept of rotation that is orthogonal to vertical motion.

FIG. 15 illustrates the mathematical concept of rotation that is orthogonal to vertical motion. The illustrated vertical motion 202 is orthogonal 206 to the illustrated rotational motion 204 because the illustrated rotational motion 204 lies in a plane that is orthogonal to the line of the vertical motion. In the present application, "substantially orthogonal" means that it is orthogonal or close enough to orthogonal such that the tab is out of the way when it is rotated and up and able to clamp when rotated and down. Accordingly, the precise degree of orthogonality will depend on the geometrics of the tab in relation to the flange and path guide. Further, it is understood that a continuous path may include vertical and rotational components without having to require that the path have only vertical and only rotational sections.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures primarily illustrate path guides as being channels/slots/cutaway portions, such guides may be embodied using posts, rods, bumpers, tracks, rails, opposing magnets, bias members, and the like and combinations thereof.

Additionally, although the figures illustrate 2-4 mounts disposed on an assembly, an assembly may include any number of mounts as appropriate for the purposes served thereby.

It is also envisioned that a flange may be non-continuous about a circumference of a housing and/or may include decorative elements/structures that are different from those illustrated.

It is expected that there could be numerous variations of the design of this invention. An example is that the mount assembly could be rectangular instead of circular as shown in FIG. 1.

Finally, it is envisioned that the components of the device may be constructed of a variety of materials, including plastics, e.g. ABS, PP, PC, PE, HDPE, LLDPE, LDPE, Nylon, PET, Delrin, Acetal, TPE, TPU, PU or any of a variety of other plastics or blends of plastics; metals, e.g. aluminum, steel, stainless steel, titanium, magnesium, zinc, copper; resins/ceramics, e.g. epoxy, bakelite, glass, crystalline ceramics, cements, clays; natural materials e.g. wood; silicone; rubber; composite materials, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A speaker mount, comprising:
   a) a flange;
   b) a support member coupled to the flange and having an elevated region spaced therefrom and a closer region closer to the flange than the elevated region;
   c) a tab moveably coupled to the elevated region of the support member;
   d) a tab bias member functionally coupled to the tab such that the tab is biased towards the flange;
   e) a path guide functionally coupled to the tab and to the support member and shaped and positioned to restrict motion of the tab relative to the support member to a path between the elevated region and the closer region;
   f) a blocking member functionally coupled to the tab such that in a blocking mode the blocking member obstructs free movement of the tab along the path guide and in a free mode does not obstruct; and
   g) a trigger assembly functionally coupled to the blocking member such that the blocking member transitions from the blocking mode to the free mode when the trigger assembly is triggered.

2. The mount of claim 1, wherein the support member is a tower.

3. The mount of claim 1, wherein the flange circumscribes a perimeter of the mount.

4. The mount of claim 1, wherein the trigger assembly includes a trigger bias member that biases the blocking member in a blocking mode.

5. The mount of claim 1, wherein the path guide includes a vertical pathing and a rotational pathing that is substantially orthogonal to the vertical pathing.

6. The mount of claim 1, wherein the trigger assembly includes a foot near the flange substantially parallel thereto and spaced therefrom.

7. The mount of claim 1, further comprising a secondary blocking member functionally coupled to the tab such that if the tab is moved to the elevated region after the trigger assembly is triggered, the secondary blocking member restricts the tab to the elevated region.

8. The mount of claim 1, further comprising an actuating member functionally coupled to the tab that when actuated causes the tab to move towards the elevated region.

9. A mount assembly, comprising:
   a) a flange;
   b) a support member coupled to the flange and having an elevated region spaced therefrom and a closer region closer to the flange than the elevated region;
   c) a tab moveably coupled to the elevated region of the support member;
   d) a tab bias member functionally coupled to the tab such that the tab is biased towards the flange;
   e) a path guide functionally coupled to the tab and to the support member and shaped and positioned to restrict motion of the tab relative to the support member to a path between the elevated region and the closer region; wherein the path guide includes a vertical pathing and a rotational pathing that is substantially orthogonal to the vertical pathing;

f) a blocking member functionally coupled to the tab such that in a blocking mode the blocking member obstructs free movement of the tab along the path guide and in a free mode does not obstruct; and g) a trigger assembly functionally coupled to the blocking member such that the blocking member transitions from the blocking mode to the free mode when the trigger assembly is triggered.

10. The mount of claim 9, wherein the trigger assembly includes a trigger bias member that biases the blocking member in a blocking mode.

11. The mount of claim 10, wherein the trigger assembly includes a foot near the flange substantially parallel thereto and spaced therefrom.

12. The mount of claim 11, further comprising a secondary blocking member functionally coupled to the tab such that if the tab is moved to the elevated region after the trigger assembly is triggered, the secondary blocking member restricts the tab to the elevated region.

13. The mount of claim 12, further comprising an actuating member functionally coupled to the tab that when actuated causes the tab to move towards the elevated region.

14. The mount of claim 13, wherein the support member is a tower.

15. The mount of claim 14, wherein the flange circumscribes a perimeter of the mount.

16. A speaker mount, comprising:
   a) a flange that circumscribes a perimeter of the mount;
   b) a tower coupled to the flange and having an elevated region spaced therefrom and a closer region closer to the flange than the elevated region;
   c) a tab moveably coupled to the elevated region of the tower;
   d) a tab bias member functionally coupled to the tab such that the tab is biased towards the flange;
   e) a path guide functionally coupled to the tab and to the support member and shaped and positioned to restrict motion of the tab relative to the support member to a path between the elevated region and the closer region, wherein the path guide includes a vertical pathing and a rotational pathing that is substantially orthogonal to the vertical pathing;
   f) a blocking member functionally coupled to the tab such that in a blocking mode the blocking member obstructs free movement of the tab along the path guide and in a free mode does not obstruct;
   g) a trigger assembly functionally coupled to the blocking member such that the blocking member transitions from the blocking mode to the free mode when the trigger assembly is triggered, the trigger assembly including a trigger bias member that biases the blocking member in a blocking mode, and a foot near the flange substantially parallel thereto and spaced therefrom;
   h) a secondary blocking member functionally coupled to the tab such that if the tab is moved to the elevated region after the trigger assembly is triggered, the secondary blocking member restricts the tab to the elevated region; and
   i) an actuating member functionally coupled to the tab that when actuated causes the tab to move towards the elevated region.

\* \* \* \* \*